(No Model.) 2 Sheets—Sheet 1.

R. J. THOMPSON.
DOG ATTACHMENT FOR LOG CARS.

No. 403,898. Patented May 21 1889.

WITNESSES:
Phil. C. Dirterich.
C. Sedgwick.

INVENTOR:
R. J. Thompson
BY Munn & Co.
ATTORNEYS.

(No Model.) 2 Sheets—Sheet 2.

R. J. THOMPSON.
DOG ATTACHMENT FOR LOG CARS.

No. 403,898. Patented May 21 1889.

WITNESSES:
Phil C. Dieterich.
C. Sedgwick

INVENTOR:
R. J. Thompson
BY Munn & Co.
ATTORNEYS.

UNITED STATES PATENT OFFICE.

ROBERT J. THOMPSON, OF GRANDIN, MISSOURI.

DOG ATTACHMENT FOR LOG-CARS.

SPECIFICATION forming part of Letters Patent No. 403,898, dated May 21, 1889.

Application filed November 15, 1888. Serial No. 290,906. (No model.)

*To all whom it may concern:*

Be it known that I, ROBERT J. THOMPSON, of Grandin, in the county of Carter and State of Missouri, have invented new and useful Improvements in Dog Attachments to Log Cars, Wagons, &c., of which the following is a full, clear, and exact description.

My invention relates to an improved dog attachment for log cars, wagons, sleds of all descriptions, and log-decks in saw-mills, and has for its object to provide a simple device whereby the logs may be effectually retained in position upon the bed of a car or wagon or other log carrier or holder and expeditiously released therefrom at the proper time.

The invention has for its further object to provide a series of dogs so arranged that the said dogs may be raised or lowered simultaneously, and wherein the dogs upon each side of the bed may be manipulated independently.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1:
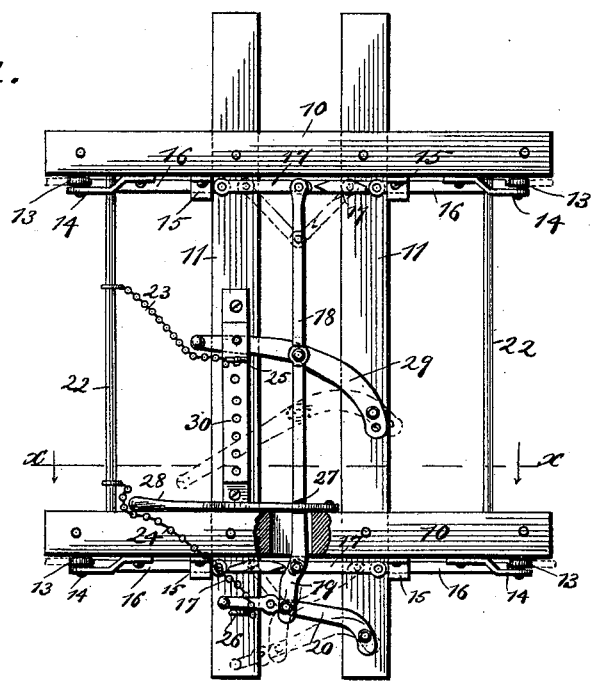
Figure 2:
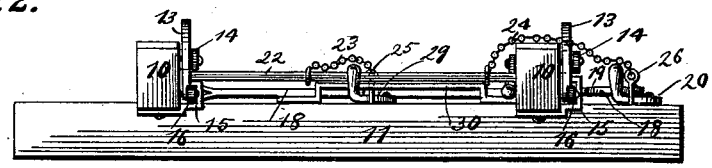
Figure 3:
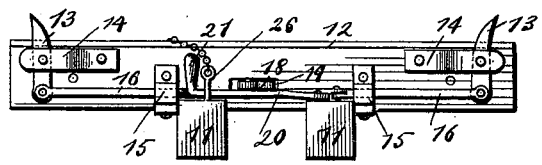
Figure 4:
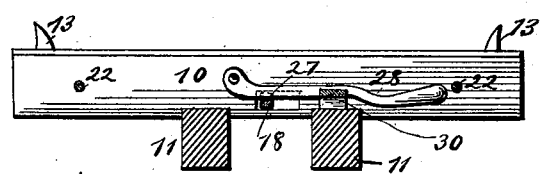
Figure 5:
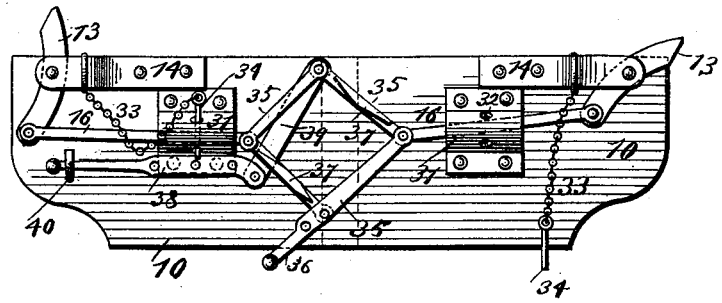
Figure 6:
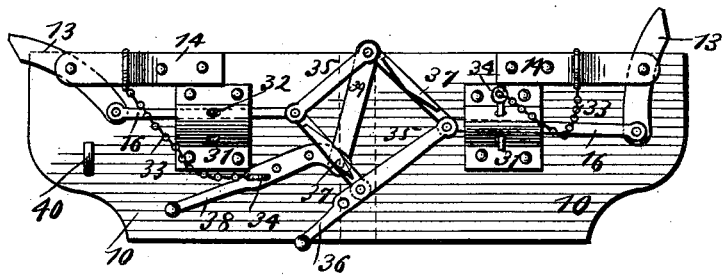
Figure 7:
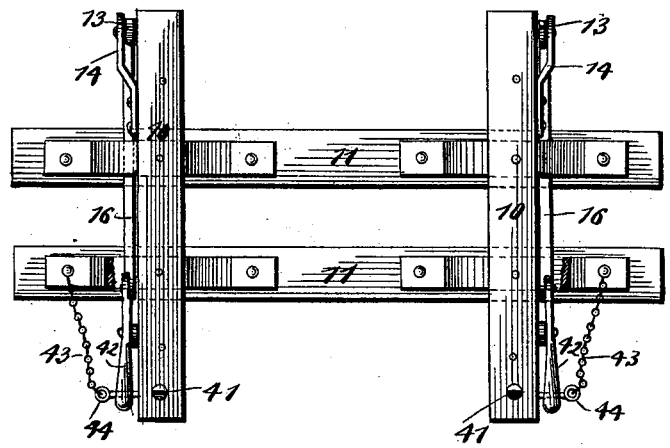
Figure 8:
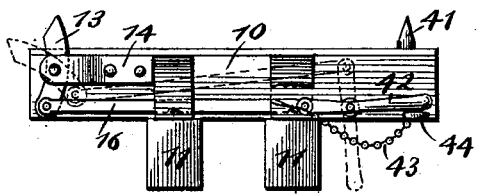

Figure 1 is a plan view of the bed of a log car or wagon having my improvement applied. Fig. 2 is a side elevation of the same. Fig. 3 is a front elevation. Fig. 4 is a transverse section taken on line $xx$ in Fig. 1, looking in the direction of the arrows indicated in connection with the said figure. Fig. 5 is a front elevation of a slightly-modified form of the invention, illustrating the dog upon the left as retained in a vertical position and the dog upon the right free to operate. Fig. 6 is a similar view illustrating an opposite position of the dogs. Fig. 7 is a plan view of a further modification, and Fig. 8 is a front elevation of Fig. 7.

In carrying out the invention cross beams or bolsters 10 are secured to the bed of the car or wagon or other log carrier or holder, which, as shown, consists of two spaced parallel longitudinal beams, 11. The bolsters may be attached to the longitudinal or reach beams in any suitable or approved manner—one being preferably at the front or near the front end of the reach-beams and the other at or near the rear end of the same. The bolsters are ordinarily provided with a metal plate, 12, secured to the upper face to prevent the logs from wearing said surface. Dogs 13 are pivoted to each of the bolsters at or near their extremities, the dogs attached to the rear bolster being pivoted upon the inner face and the dogs of the forward bolster being pivoted upon the front face of the same, as best illustrated in Fig. 1. In pivoting the dogs to the said bolsters, the pivotal pin is also passed through the outer end of a shield, 14, which shield is curved in direction of the bolsters and rigidly secured at its inner end thereto, as best illustrated in Figs. 1 and 3.

Near each of the reach-beams 11 a metal guide-loop, 15, is secured to the bolster, and a push-bar, 16, is passed through the said loops to a pivotal connection with the lower end of the dogs, as illustrated in Fig. 3. Each dog is provided with one push-bar, and the approaching ends of the several push-bars located upon each bolster are connected by two toggle-levers, 17. The approaching ends of each set of toggle-levers are connected with the rear end of a longitudinal operating-bar, 18, the forward set of toggle-levers being pivoted, also, to the said operating-bar at or near the forward end. The operating-bar is preferably slightly curved near its forward extremity, as best illustrated at 19 in Fig. 1, and the pivotal connection of the forward set of toggle-levers with the said operating-bar is preferably effected at the said point of curvature.

The forward extremity of the operating-bar 18 is pivoted to an operating-lever, 20, at or near the center of the same, which operating-lever is fulcrumed at one end upon the forward end of one of the reach-beams 11. The operating-lever 20 is preferably provided with an upwardly-extending handle, 21. The bolster-bars are preferably braced near each end by longitudinal rods 22, as best illustrated in Fig. 1, and upon the right-hand brace-rod 22 two lengths of chain, 23 and 24, are attached, carrying at their extremities locking-pins 25 and 26. The locking-pin 26 (which is the forward pin) is adapted to be inserted in a suitable aperture produced in one of the reach-beams 11 in front of the handle end of the operating-lever 20, to retain said lever in a position transversely of the two reach-beams. When said lever is in this position, the toggle-levers 17 are brought in transverse alignment with the push-bars and the dogs are held in a vertical or locked position, as illustrated in Figs. 1 and 3. A slot, 27, is produced in the upper face of the operating-bar, near its forward end, to the rear of the curve 19, which is adapted to receive a lock-lever, 28, pivoted upon the rear face of the front bolster. The lock-lever 28 is adapted to enter the slot 27 in the operating-bar 18, to retain the dogs in a vertical or locked position, the said lock-lever serving as an adjunct to the locking-pin 26; or the locking-pin may be dispensed with and the lever 28 alone retained.

Upon one of the reach-beams 11, between the bolsters, a second lock-lever, 29, is pivoted, which lock-lever at or near its center is also pivoted to the operating-bar 18. The free end of the lock-lever 29 is held to slide beneath an apertured yoke, 30, secured to the reach-beam opposite that upon which the end of the said lock-lever is pivoted, as is best illustrated in Fig. 1.

It will be observed that the operating-bar 18 may be reciprocated by the manipulation of the lock-lever 29, as well as by the manipulation of the main operating-lever 20. The lever 29 thus acts in a dual capacity—that of a lock-lever and also an operating-lever. As a lock-lever, the said lever 29 is adapted to retain the dogs in an inclined position, admitting of the free discharge of the logs. This position of the dogs is brought about by carrying either of the levers 20 or 29 in direction of the front. The lock-pin 25 is then placed in one of the apertures of the yoke 30, to the rear of the intermediate operating-lever or lock-lever 29, whereby said lever is prevented from moving, thus effectually retaining the operating-bar at its forward throw.

In the modification illustrated in Figs. 5 and 6 the dogs 13 are pivoted to the bolster-bars 10 in the manner hereinbefore described, and a push-bar, 16, is likewise pivoted to the lower end of each of the said dogs located upon each of the bolsters. The push-bars 16 are, however, made to reciprocate in a jacket, 31, rigidly attached to the bolster, which jacket is provided with top and bottom vertically-aligning apertures 32, and the push-bar is also provided with an aperture adapted to register with the apertures of the jacket when the dogs are in a vertical position. A chain, 33, is attached to the guide-plate 14, or to the bolster at any point convenient to the jacket, which chain is provided with a lock-pin, 34, adapted to enter the apertures in the jacket and pass through the aperture in the push-bar.

The approaching ends of the opposing push-bars of each bolster are provided with two pivoted toggle-levers, 35, as hereinafter described, and the contiguous extremities of each set of toggle-levers upon each bolster are pivoted together, as illustrated in Figs. 5 and 6. The lower toggle of one of the push-bars (the push-bar at the right, for instance) is carried beyond its fellow toggle-levers, to provide a handle or operating-lever, 36. Shoulders 37 are formed upon the two approaching toggle-levers, adapted to limit the movement of the same when the handle 36 is carried upward to force the dogs to a vertical position. A lock-bar, 38, is connected with the upper pivotal point of the toggle-levers by a link, 39, the said lock-bar being adapted to engage with a hook, 40, located upon one end of the bolster.

In operation, if it is desired to unload the logs upon the right, the lock-bar 38 is made to engage with the hook 40, as shown in Fig. 5, and the lock-pin upon the left is passed through the left-hand jacket and also the left-hand push-bar, thus locking the left-hand dog in a vertical position. The lock-pin is removed from the right-hand jacket and push-bar, whereupon the right-hand dog is free to move. This movement is effected by carrying the handle 36 downward, which draws in the push-bar, and consequently brings the right-hand dog to an inclined position below the upper face of the bolster, or nearly so. When it is desired to discharge the logs upon the left, the position of the parts to accomplish this result is fully illustrated in Fig. 6, in which it will be observed that the lock-pin to the right is placed in position, thereby securing the right-hand dog in position, and the lock-bar 38 is released from its hook and the left-hand pin withdrawn from the left-hand jacket and push-bar.

It will be observed in the modification illustrated in Figs. 5 and 6 that the dogs pivoted upon each of the bolster-bars are operated independently.

In the form of the device illustrated in Fig. 7 the dogs upon each bolster-bar are also operated independently, and in this modification but one pivoted dog 13 is employed upon each bolster, a fixed dog, 41, being rigidly secured in the upper face of the bolster at the end opposite that upon which the dog 13 is pivoted, as is best illustrated in Fig. 8. The pivoted dog 13 is provided with a guide-plate, 14, as in the other form hereinbefore described, and a push-bar, 16, is likewise pivoted to the lower end of the said dog, which push-bar is carried over the reach-beams 11 and pivoted to an operating-lever, 42, fulcrumed upon the face of the bolster near the end upon which the fixed dog 41 is located. A chain, 43, is attached to the bolster-bars, or to the reach-beam, as desired, which chain carries a locking-pin, 44, as shown in Figs. 5 and 6, which locking-pin is adapted to enter an aperture produced in the bolster below the operating-lever 42, when said lever is in a horizontal position, as is best illustrated in Fig. 8, and when the lever is in a horizontal position the pivoted dog 13 is retained in a vertical position.

In this form of the device, when it is desired to discharge the logs, the pin 34 is removed and the operating-lever pressed downward to a vertical position, whereupon the dogs 13 will be brought to an inclined position, and will present no obstruction to the discharge of the logs from that side of the vehicle.

Having thus described my invention, I claim as new and desire to secure by Letters Patent—

1. The combination, with the bolster or cross-beam of a log carrier or loader, of dogs pivoted near the opposite ends of said beam, push-bars connected at one end to the said dogs, toggle-levers connected at their outer ends to said push-bars, and an operating-lever connected with the pivotal ends of said toggle-levers, substantially as and for the purpose described.

2. The combination, with the bolster or cross-beam of a log carrier or loader, of dogs pivoted near the opposite ends of said beam, push-bars connected to the said dogs, toggle-levers connected at their outer ends to the push-bars, an operating-lever connected with the pivotal ends of the toggle-levers, and means, substantially as shown, for locking the said lever, substantially as shown and described.

3. The combination, with the front and rear bolsters or cross-beams of a log-carrier, of dogs pivoted near the outer ends of said bolsters, push-bars connected at one end to said dogs, toggle-levers connected at their outer ends with the inner ends of the push-bars, a longitudinal bar pivotally connected to the front and rear set of toggle-levers, an operating-lever connected with the said longitudinal bar, and means, substantially as shown, for locking the operating-lever in position, substantially as and for the purpose described.

4. The combination, with the bolsters or cross-beams of a log carrier or holder, of dogs pivoted to the said bolster or cross-beams, push-bars pivoted to said dogs, toggle-levers pivoted to the push-bars, an operating-bar engaging the toggle-levers of each bolster, an operating-lever connected with the operating-bar, and a lock-lever adapted to engage the said operating-bar, substantially as shown and described.

5. The combination, with the bolster or cross-beam of a log carrier or holder, of dogs pivoted thereto, a push-bar pivoted to said dogs, an apertured jacket inclosing said push-bars, toggle-levers pivoted to the push-bars and to one another, one of which toggles is projected to form a lever-handle, locking-pins adapted to enter the apertures of the jacket, a locking-bar, and a link connecting said locking-bar and the toggle-levers, all combined for operation substantially as shown and described.

6. The combination, with the bolster or cross-beam of a log carrier or holder, of dogs pivoted thereto, a push-bar pivoted to said dogs, an apertured jacket inclosing said push-bars, toggle-levers pivoted to the push-bars and to one another, one of which toggles is projected to form a lever-handle, locking-pins adapted to enter the apertures of the jacket, a locking-bar, a link connecting the locking-bar and the toggle-levers, a hook secured to the bolster adapted to receive the locking-bar, and shoulders formed upon the outer face of two opposing toggles, all combined for operation substantially as shown and described.

ROBERT J. THOMPSON.

Witnesses:
R. W. WRIGHT,
WM. H. CATERN.